United States Patent [19]

Tamura et al.

[11] 3,772,854

[45] Nov. 20, 1973

[54] EXHAUST GAS DESULFURIZING METHOD AND APPARATUS

[75] Inventors: Zensuke Tamura; Yukio Hishinuma; Norio Arashi, all of Hitachi-shi, Japan

[73] Assignee: Hitachi, Ltd., Tokyo, Japan

[22] Filed: July 16, 1971

[21] Appl. No.: 163,345

[30] Foreign Application Priority Data
July 29, 1970 Japan.............................. 45/65786

[52] U.S. Cl.......................................... 55/73, 55/74
[51] Int. Cl............................................. B01d 53/04
[58] Field of Search .................. 55/48, 73, 84, 179, 55/186, 74; 23/2 R, 25 Q, 168, 178 S

[56] References Cited
UNITED STATES PATENTS
3,294,487  12/1966  Pauling................................. 23/168
3,486,852  12/1969  Tamura et al. ....................... 23/168

FOREIGN PATENTS OR APPLICATIONS
709,680  5/1965  Canada.................................. 55/84

Primary Examiner—Charles N. Hart
Attorney—Craig, Antonelli & Hill

[57] ABSTRACT

A method of and an apparatus for removing sulfur oxides ($SO_2$, $SO_3$) contained in combustion gases by using activated carbon. In a series of operation of removing $SO_2$ and $SO_3$ in the exhaust gas by adsorbing them on activated carbon and washing the activated carbon with water, the resultant dilute sulfuric acid ($H_2SO_4$) is subjected to heat exchange with part of the exhaust gas, whereby the dilute sulfuric acid is concentrated and the temperature of the exhaust gas is lowered. The cooled exhaust gas is mixed with the main flow of uncooled exhaust gas to adjust the temperature of the whole exhaust gas to a level optimum for enabling the activated carbon to exhibit its highest adsorbing activity, and then the exhaust gas is contacted with the activated carbon, whereby the sulfuric oxides and other harmful gases contained in said exhaust gas are removed and the exhaust gas is released into the atmosphere at such a temperature as will not cause smoke pollution.

5 Claims, 1 Drawing Figure

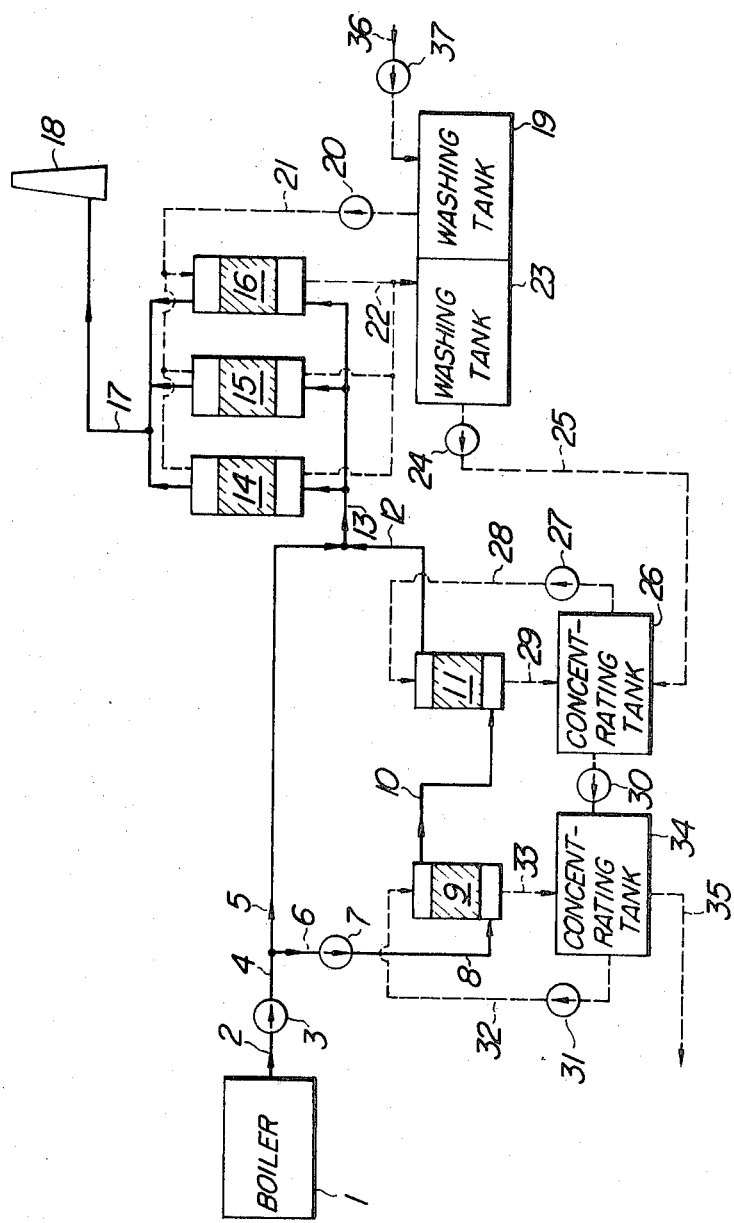

EXHAUST GAS DESULFURIZING METHOD AND APPARATUS

BACKGROUND OF THE INVENTION

1. Field of the Invention

This invention relates to a method of removing sulfur components from the combustion gases exhausted from boilers or the like utilizing heavy oil as fuel, and to an apparatus for practicing the method. More specifically, the invention relates to improvements in the exhaust gas desulfurizing method and apparatus utilizing activated carbon. Namely, in a series of operation of removing $SO_2$ and $SO_3$ in the exhaust gas by absorbing them on activated carbon and washing the activated carbon with water, the resultant dilute sulfuric acid is subjected to heat exchange with part of the exhaust gas, whereby the dilute sulfuric acid is concentrated and the temperature of the exhaust gas is lowered, and the cooled exhaust gas is mixed with the main flow of uncooled exhaust gas to adjust the temperature of the whole exhaust gas to a level optimum for enabling the activated carbon to exhibit its highest adsorbing activity, and then the exhaust gas is contacted with the activated carbon, whereby the sulfuric oxides and other harmful gases contained in said exhaust gas are removed and the exhaust gas is released into the atmosphere at such a temperature as will not cause smoke pollution.

2. Description of the Prior Art

A conventional exhaust gas desulfurizing apparatus of the type wherein sulfur oxides are adsorbed on activated carbon and desorbed therefrom by washing the activated carbon with water, is composed mainly of several activated carbon packed towers and several washing water tanks. For instance, an $SO_2$-containing exhaust gas generated from a combustion apparatus, such as a boiler, is led into a flue, pressurized by a blower and led through another flue into the activated carbon packed towers wherein $SO_2$ is removed by the activated carbon, and then released into the atmosphere from a chimney. The activated carbon in the towers can be regenerated by washing it with water to desorb the $SO_2$ therefrom in the form of $H_2SO_4$. For washing the activated carbon with water, the water in the water tank is sprayed from above the activated carbon through a pipe by means of a pump, and the resultant dilute sulfuric acid drained from the bottom of said water tank is led into the other water tank. The dilute sulfuric acid thus accumulated in the water tank is concentrated by heat from a separated heat source and collected as sulfuric acid of high concentration. The first-mentioned water tank is continuously supplied with industrial water in an amount corresponding to the amount of the dilute sulfuric acid discharged from said water tank and the amount of water retained by the activated carbon.

SUMMARY OF THE INVENTION

The object of the present invention is to improve the conventional method and apparatus described above and thereby to enhance the thermal efficiency and economy of the apparatus. Namely, according to the present invention, instead of using the energy from the external heat source for heat-concentrating the dilute sulfuric acid resulting from washing the $SO_2$-adsorbed activated carbon with water, the sensible heat of part of the exhaust gas, branched from the main exhaust gas flow, is utilized to concentrate the dilute sulfuric acid to collect it as sulfuric acid of high concentration, and furthermore said branched exhaust gas cooled by heat exchange with the dilute sulfuric acid is again joined with the main exhaust gas flow to adjust the temperature of the whole exhaust gas at the inlets of the activated carbon packed towers to about 100° – 150°C., whereby the power of adsorption and the useful life of the activated carbon are improved. At the same time, the temperature of the treated exhaust gas, released from the chimney into the atmosphere, is maintained above 100°C., facilitating the spreading of the gas into the atmosphere and thereby preventing atmospheric pollution.

According to the present invention there is provided an exhaust gas desulfurizing apparatus for removing sulfur oxides from the exhaust gas by using activated carbon, comprising several activated carbon packed towers, a main flue for leading the exhaust gas from a combustion apparatus into said activated carbon packed towers, a flue branched from said main flue, means for washing the activated carbon in said towers with water to desorb the sulfur oxides therefrom, means for concentrating the resultant dilute sulfuric acid from said towers by heat exchange with part of the exhaust gas supplied thereto through said branched flue, and a flue for leading the exhaust gas from said dilute sulfuric acid concentrating means into said main flue to mix the same with the main exhaust gas flow before said main exhaust gas flow is admitted into said activated carbon packed towers.

BRIEF DESCRIPTION OF THE DRAWING

The drawing is a block diagram showing an embodiment of the exhaust gas desulfurizing apparatus according to the present invention.

DESCRIPTION OF THE PREFERRED EMBODIMENT

A preferred embodiment of the exhaust gas desulfurizing apparatus of the invention will be described in detail with reference to the accompanying drawing.

An $SO_2$-containing exhaust gas from a boiler 1 flowing in a flue 2 is pressurized by a blower 3 and flows into a main flue 4. The main flue 4 is branched into flues 5 and 6. In the embodiment shown, the desulfurizing operation was conducted under such conditions that the flow rate of the exhaust gas in the main flue 4 was 420,000 $Nm^3/H$; the flow rate in the flue 5 was 331,000 $Nm^3/H$; the flow rate in the flue 6 was 89,000 $Nm^3/H$; and the temperature of the exhaust gas was 150°C.

The exhaust gas passing in the branched flue 6 is used for the concentration of the dilute sulfuric acid resulting from desulfurization and the proportion of the exhaust gas flow rates in the flues 5 and 6 is adjusted such that the temperature of the joined exhaust gas at the inlets of respective activated carbon packed towers 14, 15 and 16 will be about 100° – 150°C. This temperature is variable depending upon the properties of the activated carbon but is selected to be higher than about 100°C. (50° – 80°C. in the conventional apparatus) so as to facilitate the dispersion of the desulfurized exhaust gas into the atmosphere from a chimney 18. The concentrations of the sulfur oxides, such as $SO_2$, in the exhaust gas should of course be taken into account in determining the temperature.

From the view of the properties, namely the firing point of 300° – 400°C., the adsorption limit temperature of about 200°C. and the durability, of the activated carbon commonly being used at the present time, the temperature is selected within the range of about 100° – 150°C. and preferably within the range of 100° – 130°C.

The exhaust gas branched into the flue 6 under the condition set forth above is pressurized by a blower 7 and then passed through a high concentration unit 9, a flue 10 and a low concentration unit 11, while being cooled. The cooled exhaust gas flows in a flue 12 and is again joined with the main flow of exhaust gas passing in the flue 5. The temperature of the joined exhaust gas is about 131°C. Then, the exhaust gas is admitted into the activated carbon packed towers 14, 15 and 16 through a flue 13 and exhausted into the atmosphere from the chimney 18 at a temperature of 109°C. It will be understood that the temperature of the exhaust gas being released into the atmosphere can be easily adjusted by changing the mixing ratio of the gases passing in the flues 12 and 5.

In the activated carbon packed towers the $SO_2$ adsorbed on the activated carbon is combined with $O_2$ in the exhaust gas (through the exothermic oxidizing reaction) to form $SO_3$, which is thereafter desorbed in the form of dilute sulfuric acid by the washing water supplied through a pipe 21. The dilute sulfuric acid thus formed is collected in a washing tank 23, and thence delivered through a pipe 25 to a concentrating tank 26 or the top of the low concentration unit 11 by means of a pump 24. The dilute sulfuric acid in the concentrating tank 26 is sprayed from the top of the low concentration unit 11 through the pump 27 and a pipe 28, or is brought into direct contact with the exhaust gas through the surface of a filler, such as Rasching rings, to have the water present therein evaporated, and then returned to the concentrating tank 26 through a pipe 29, and this operation is repeated continuously.

The concentration of the dilute sulfuric acid in the tank 26 gradually becomes high as the water therein is evaporated by the exhaust gas in the manner described and the dilute sulfuric acid thus concentrated is delivered into a tank 34 by a pump 30 and further concentrated by being repeatedly cycled through a pump 31, a pipe 32, a high concentration unit 9 and a pipe 33 in the same manner as described above. As a result, sulfuric acid or high concentration is accumulated in the tank 34 and delivered through a pipe 35 as the product sulfuric acid.

In the embodiment illustrated in the drawing, the temperature of the branched exhaust gas is 150°C. at the branched point, 95°C. at the outlet of the high concentration unit 9 and 60°C. at the outlet of the low concentration unit 11. The exhaust gas thus cooled is led through a flue 12 and joined with the main flow of exhaust gas at the joint between the flues 5 and 13. The concentration of the sulfuric acid in the tank 34 is about 65 percent.

In desulfurizing the exhaust gas from a boiler in a thermal power plant or the like, according to the present invention, the dusts in the exhaust gas are removed by a dust collector, through not apparent in the drawing. However, if the amount of the dusts is less than 30 – 50 mg/Nm³, the apparatus of the invention is capable of treating the exhaust gas without necessitating the provision of a dust collector.

As described hereinabove, by employing the desulfurizing method and apparatus of the invention the concentration of dilute sulfuric acid, resulting from the water-washing of activated carbon in the desorption step, can be achieved by the effective use of the energy of the exhaust gas to be treated, without using a separate heat source, so that the apparatus is economical and of a great practical value as an industrial apparatus. It should be particularly noted that according to the present invention there is the advantage that the temperature of the exhaust gas being released into the atmosphere can be easily adjusted by regulating the flow rate of the exhaust gas branched from the main flow. Therefore, by elevating the temperature of the exhaust gas, it is possible to quickly disperse the exhaust gas in the atmosphere even under such condition that the atmospheric air is low in temperature, high in humidity and steady in the morning and evening. With the conventional apparatus, since the temperature of the exhaust gas released therefrom is low, the exhaust gas under the condition described above stays above the ground surface without moving upwardly by being entrained in an ascending air stream, thus causing a heavy damage to the agricultural crops, etc., and this has been the serious drawback of the conventional apparatus. In this view, it will be understood that the method and apparatus of the invention are a great contribution to the prevention of the public damage.

We claim:

1. An exhaust gas desulfurizing apparatus for removing sulfur oxide from an exhaust flue gas containing sulfur oxide comprising a main flue gas duct for conducting a flue gas containing sulfur oxide from a flue gas source to a plurality of adsorption means packed with activated carbon, means for washing said adsorption means with a liquid to remove adsorbed sulfur oxide, means for collecting said washing liquid after it was washed said activated carbon removing sulfur oxide adsorbed thereon, means connected to said collecting means for concentrating said washing liquid comprising a low concentrating means and a high concentrating means, a by-pass duct connected at first and second points along said main flue duct for conducting a portion of said flue gas from said flue source through said high concentrating means and then through said low concentrating means and then to said main flue duct for conduction to said adsorption means.

2. An exhaust gas desulfurizing apparatus as defined in claim 1 wherein said concentrating means further includes a tank for each of said high concentrating means and said low concentrating means, means for connecting the concentrating tank to each of said concentrating means, and a pump for supplying the concentrated liquid in the concentrating tank for the low concentrating means to the concentrating tank for the high concentrating means.

3. An exhaust gas desulfurizing apparatus as defined in claim 1, wherein said low concentrating means is of the type in which the dilute washing liquid is concentrated by heat exchange with the exhaust gas in direct contact therewith.

4. A method of desulfurizing an exhaust gas containing sulfur oxide comprising conducting a main exhaust gas flow of flue gas containing sulfur oxide from a flue gas source to an adsorption means packed with activated carbon for adsorbing sulfur oxide from the gas, diverting a portion of said main flue gas flow, washing the adsorption means with water to produce dilute sulfuric acid, cooling the diverted flue gas with the dilute sulfuric acid resulting from the water washing of the adsorption means, said cooling comprising conducting the diverted flue gas through a high concentrating means and then through a low concentrating means thereby cooling the diverted flue gas by heat exchange, reintroducing the cooled diverted flue gas into the main flow of exhaust gas to adjust the temperture of said main flow to a level optimum for the adsorption of the sulfur oxides by the activated carbon and conducting the joint flow to the adsorption means.

5. An exhaust gas desulfurizing method as defined in claim 4, wherein the proportion of said branched exhaust gas and the remaining main flow of exhaust gas is selected such that the temperature of the joined flow of exhaust gas will be in the range of 100° – 150°C.

* * * * *